United States Patent [19]

Schmidt et al.

[11] Patent Number: 5,715,439
[45] Date of Patent: Feb. 3, 1998

[54] BI-DIRECTIONAL CO-PROCESSOR INTERFACE

[75] Inventors: Otomar Schmidt, Richmond Heights; Richard S. Gunsaulus, Highland Heights; Ronald E. Schultz, Solon; Charles M. Rischar, Chardon; Jeffrey W. Brooks, Mentor-On-The-Lake, all of Ohio

[73] Assignee: Allen-Bradley Company, Inc., Milwaukee, Wis.

[21] Appl. No.: 762,650

[22] Filed: Dec. 9, 1996

[51] Int. Cl.⁶ .................................. G06F 9/455
[52] U.S. Cl. ................. 395/570; 395/379; 395/561
[58] Field of Search ...................... 395/570, 561, 395/379

[56] References Cited

U.S. PATENT DOCUMENTS 5,093,908  3/1992  Beacon et al. ............... 395/376
5,159,686 10/1992  Chastain et al. ............. 395/650
5,430,885  7/1995  Kaneko et al. .............. 395/800
5,495,588  2/1996  Gibart et al. ................ 395/376

*Primary Examiner*—Robert B. Harrell
*Assistant Examiner*—Saleh Najjar
*Attorney, Agent, or Firm*—Keith M. Baxter; John M. Miller; John J. Horn

[57] ABSTRACT

A co-processor interface allows both a general processor and a relay ladder processor to make repeated calls to each other in the execution of subroutines. A register transfer instruction detected by the relay ladder processor triggers a suspension of the general processor. Return of control to the general processor is accomplished at the same time a register value is provided to the general processor that the general processor uses to reinitialize its program counter. For most single level transfers of control, a single transition instruction between the general processor to the relay ladder processor is sufficient to perform a call.

14 Claims, 3 Drawing Sheets

BI-DIRECTIONAL CO-PROCESSOR INTERFACE

FIELD OF THE INVENTION

This invention relates to industrial controllers for use in controlling industrial processes and, in particular, an industrial controller employing both a general purpose processor and a special purpose relay language processor.

BACKGROUND OF THE INVENTION

Industrial controllers are specialized computers used for controlling an industrial process, such as an assembly line, in real time in accordance with a stored program. Under the direction of the stored program, the industrial controller examines a series of inputs, reflecting the status of the industrial process, and changes a series of outputs, controlling the industrial process.

Industrial controllers are often programmed in a "relay ladder" language. This language, which has become an accepted standard in industry, employs instructions represented by "contacts" and "coils" of virtual relays connected in ladder-like "rungs". A relatively small number of basic ladder logic constructions provides a complete set of Boolean primitives from which complex controlled programs may be crafted. The core instructions include XIC contacts ("examine if closed"), XIO ("examine if open"), and OTE coils ("output enable"). The former two instructions check the state of a binary input and are graphically represented by either normally open or normally closed contacts in the relay ladder diagram. The latter instruction identifies the state of an output and is graphically represented by a coil. Other "coil" instructions include the OTL coil ("output latch") and OTU coil ("output unlatch").

Over the years, special purpose instructions that permit counting, timing, simple mathematics (including comparisons of numbers, addition and subtraction) and basic Boolean manipulation have augmented these basic relay ladder logic instructions. These commonly used instructions, together with more basic instructions described initially, will henceforth be collectively termed, "relay ladder instructions" reflecting their common usage and heritage.

With increasing overlap between the technologies of industrial controllers and conventional computers, a demand for industrial controllers that recognize traditional computer-like instructions has arisen. Accordingly, present day industrial controllers are also capable of implementing a variety of non-traditional instructions, other than relay ladder instructions, that permit more complex mathematical manipulation, such as multiplication, division, taking a square root, as well as basic machine language instructions, such as shift left and right, jumping (to subroutines) and those implementing communication protocols. These additional instructions will henceforth be referred to as "general instructions".

Advances in conventional computer architecture and the availability of these architectures for incorporation into large scale integrated circuits makes it desirable to use these conventional or general purpose processors for the execution of general instructions used in a control program. By using such general purpose processors, general instructions may be executed efficiently and a wide variety of development tools and software libraries available for programming such general purpose processors, may be used. On the other hand, relay ladder instructions are not efficiently executed on such general purpose processors and here it is preferable to employ a special relay language processor for the execution of such relay ladder instructions.

The use of both a general purpose processor and a specialized relay language processor operating together to execute a control program is described in U.S. Ser. No. 08/154,232 filed Nov. 18, 1993 and entitled High Speed Relay Language Processor which was abandoned, assigned to the assignee of the present invention and hereby incorporated by reference. In this patent, a co-processor relationship is described where the relay language processor may transfer control for a number of instructions to the general purpose processor. The general purpose processor, upon completion of its assigned instructions, returns control to the relay language processor. Because the preponderance of instructions of a real-time control program will be relay ladder instructions, the general purpose processor is run as a co-processor subservient to the relay language processor.

In certain cases, the co-processor (for example, the general purpose processor) may need to perform functions within a routine that are also performed by the primary processor. In this case, the same function will be programmed twice, once in each of the different instruction sets of the processors. This duplication of functions creates two problems. The first problem is that in revising the control program, it must be ensured that changes in the function written for the co-processor are exactly duplicated in the function written for the primary process. The second problem is that there will inevitably be differences in the operation of the two functions written using wholly different instruction sets. These differences could affect the reliability of the application program.

SUMMARY OF THE INVENTION

The present invention provides a co-processor interface between a general purpose processor and a relay ladder processor where each processor can call the other processor to perform subroutines.

Thus, complete flexibility as to which processor performs a given function is provided and only a single implementation of each function must be written or maintained.

Specifically, the invention provides an industrial controller for executing a user program having relay ladder control instructions and general computer instructions. The controller includes a relay ladder and general processor, each having a corresponding program counter which identifies instructions of the user program for the processor to execute. The relay ladder processor executes relay ladder control instructions identified by its program counter until it comes to either a transition instruction or a return instruction. Upon encountering a transition instruction, it transfers a new value to the program counter of the general processor and transfers control to the general processor. The general processor in turn executes general computer instructions until it encounters a transition instruction or a return instruction. Like the relay ladder processor, the general processor, upon encountering a transition instruction, transfers a new value to the program counter of the relay ladder processor and then transfers control to the relay ladder processor. Both processors respond to a return instruction by returning control to the other processor at a previously retained value of the other processor's program counter.

Thus, it is one object of the invention to provide for an interface between specialized processors so that each can transfer control to the other processor to execute a subroutine and then regain control at the conclusion of that subroutine. By providing each processor with an ability to cause a change in the program counter of the other processor, this other processor can be directed to the subroutine. Return instructions allow the initial processor to regain control of the program at the point at which it departed. This arrangement also allows for nested calls in which each processor calls the other processor for as many times as necessary to complete the routine. At conclusion of the routine, each processor successively returns control to the other until the original processor again has control at the point of the initial call.

The transition instruction may be an instruction which requests a value of the register of the relay ladder processor. The relay ladder processor, detecting this instruction, may put the general processor into a wait state.

Thus, it is another object of the invention to provide the above co-processor system using standard co-processor instructions. Many general processor architectures provide such register transfer instructions. The processor requesting the register transfer is suspended in operation until completion of the co-processing operation. It is then returned a value which it places in its program counter to effectively execute a jump to a new routine as directed by the co-processor.

The transition instructions may be invoked in response to a fault detected by the relay ladder processor and may also be invoked by an interrupt of the relay ladder processor.

Thus, it is another object of the invention to provide for a co-processing system having the above features that can handle interrupts in which execution of the processor is interrupted by an external event. The interrupt is treated simply as a transfer to a processor assigned the responsibility of handling interrupts. In this way, a single processor may handle all interrupts.

The processor making a call to the other processor may retain its program counter in its program counter register.

Thus, it is another object of the invention to reduce the overhead in transferring control between processors. For single levels of calls, the processor making the initial call by simply holding its program counter without change, eliminating the need for an additional program counter saving and restoring step. When control is returned to that processor, it resumes operation based on the program counter value.

Another object of the invention is to permit both processor to share the stack, as results from the ability of the processors to transfer the stack pointer. As a result, less memory need be reserved for the stack. A shared stack also facilitates parameter passing.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE PREFERRED EMBODIMENT

Controller Hardware

Figure 1:
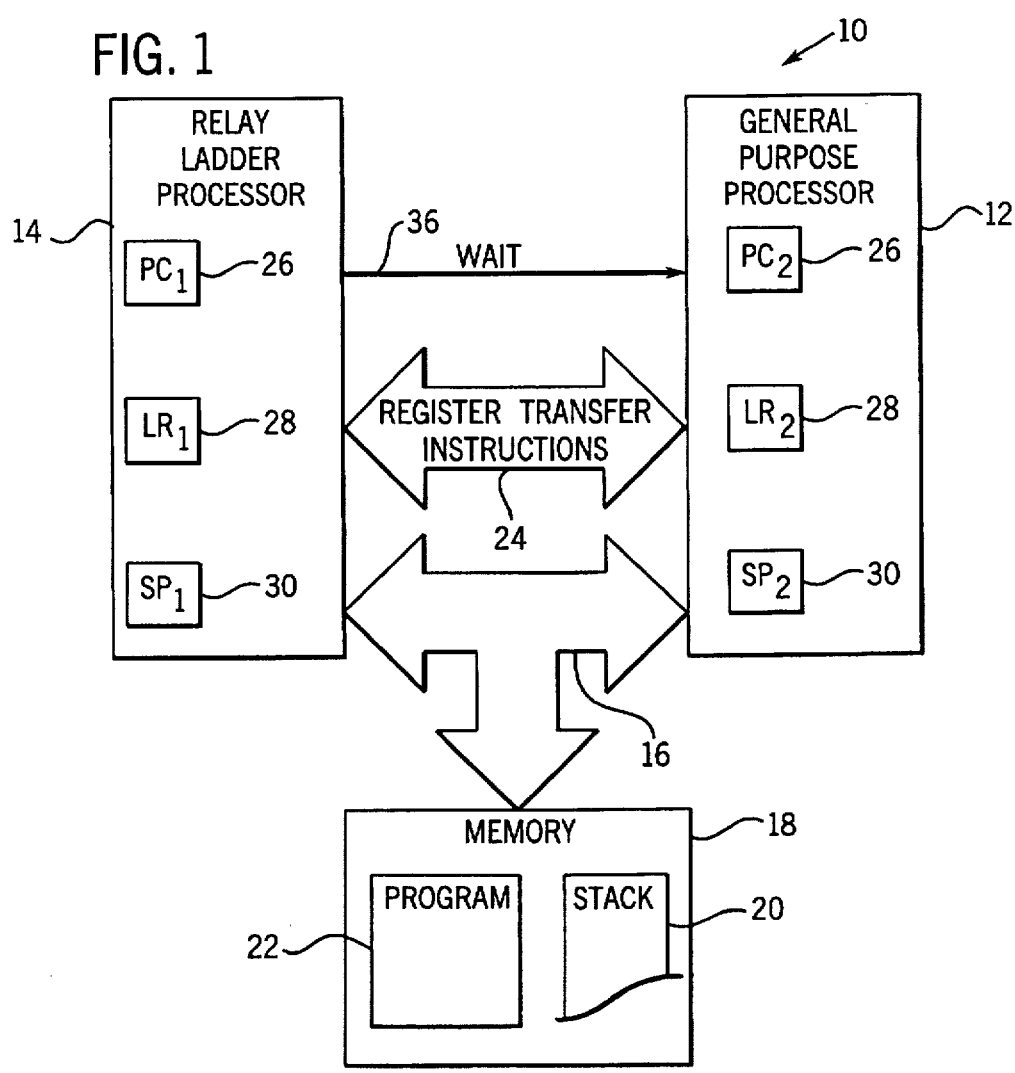
FIG. 1 is a simplified block diagram of the architecture of an industrial controller according to the present invention showing two processors sharing a memory but having separate internal registers including a program counter.

Referring to FIG. 1, an industrial controller 10 of the present invention includes a general purpose processor 12 having an instruction set having standard arithmetic and logical functions and a relay ladder processor 14 executing an instruction set of relay ladder instructions.

The general purpose processor 12 and the relay ladder processor 14 share a standard data/address bus 16 communicating with a common memory 18 as will be understood in the art. The memory 18 provides storage space for data used by the processors 12 and 14 and includes a stack 20 into which data values may be temporarily stored and a user program 22 comprised of both relay ladder language instructions which may be executed by the relay ladder processor 14 and general processor instructions executable by the general purpose processor 12.

The industrial controller 10 also includes register transfer lines 24 which allow processors 14 and 12 to read and write to each other's registers including program counters 26, link registers 28, and stack pointers 30. A WAIT line 36 from the relay ladder processor 14 to the general purpose processor 12 allows the relay ladder processor 14 to suspend the operation of the general purpose processor.

As will be described in more detail below, either processor 12 and 14 may execute portions of the user program 22 and may call the other processor 12 or 14 for assistance in certain subroutines. In this regard, each processor may serve as a co-processor for the other and the terms "co-processor" and "primary processor" are not well adapted to identify either the processor 12 or 14. Therefore, the relay ladder processor 14 will be designated as the first processor and the general purpose processor 12 will be designated as the second processor. Following this convention, the program counter link register and stack pointer for the relay ladder processor 14 will be designated $PC_1$, $LR_1$ and $SP_1$, respectively, whereas the same registers in the general purpose processor 12 will be designated $PC_2$, $LR_2$, and $SP_2$, respectively.

These registers, as are well understood in the art, have particular functions in the processors 14 and 12. The program counter registers 26 point to the next instruction to be executed by the processors 14 and 12. If the value of the program counter 26 is changed, the processors effectively jump in the program 22. The link registers 28 provide addresses for returns from subroutines executed by the processors. The stack pointers 30 indicate the next clear location in the stack 20 at which data may be stored or read.

Overview of Co-Processor Operation

Upon starting of the industrial controller 10, the general purpose processor 12 assumes control and begins executing general instructions including the initialization of the stack pointer and link register of both processors 12 and 14. The registers of the relay ladder processor 14 may be initialized by the general purpose processor 12 through a set of specific register transfer lines 24 as have been previously described, which permit one processor to directly write to the registers of the other processor. Such instructions are well known in the art.

Control is then passed to the relay ladder processor 14 for it to execute relay ladder instructions. This transfer of control is initiated by a register transfer instruction: "MRC RUN" which requests a transfer of a register from the relay ladder processor 14 to the general purpose processor 12. The RUN operand, signified by the setting of optional bits in the MRC instruction, is decoded by circuitry of the relay processor 14 to cause the relay processor 14 to assert the WAIT line 36 which causes the general purpose processor 12 to suspend operation. As will be described in more detail below, the relay ladder processor 14 then begins execution of the user program.

After the first transfer of control from the general purpose processor 12 to the relay ladder processor 14, each processor 12 and 14 executes the instructions unique to it but may call the other processor 12 or 14 to execute subroutines written in instructions particular to that processor. These calls may be nested so that during a call, the processor that is called, may call the other processor in turn.

Figure 2:
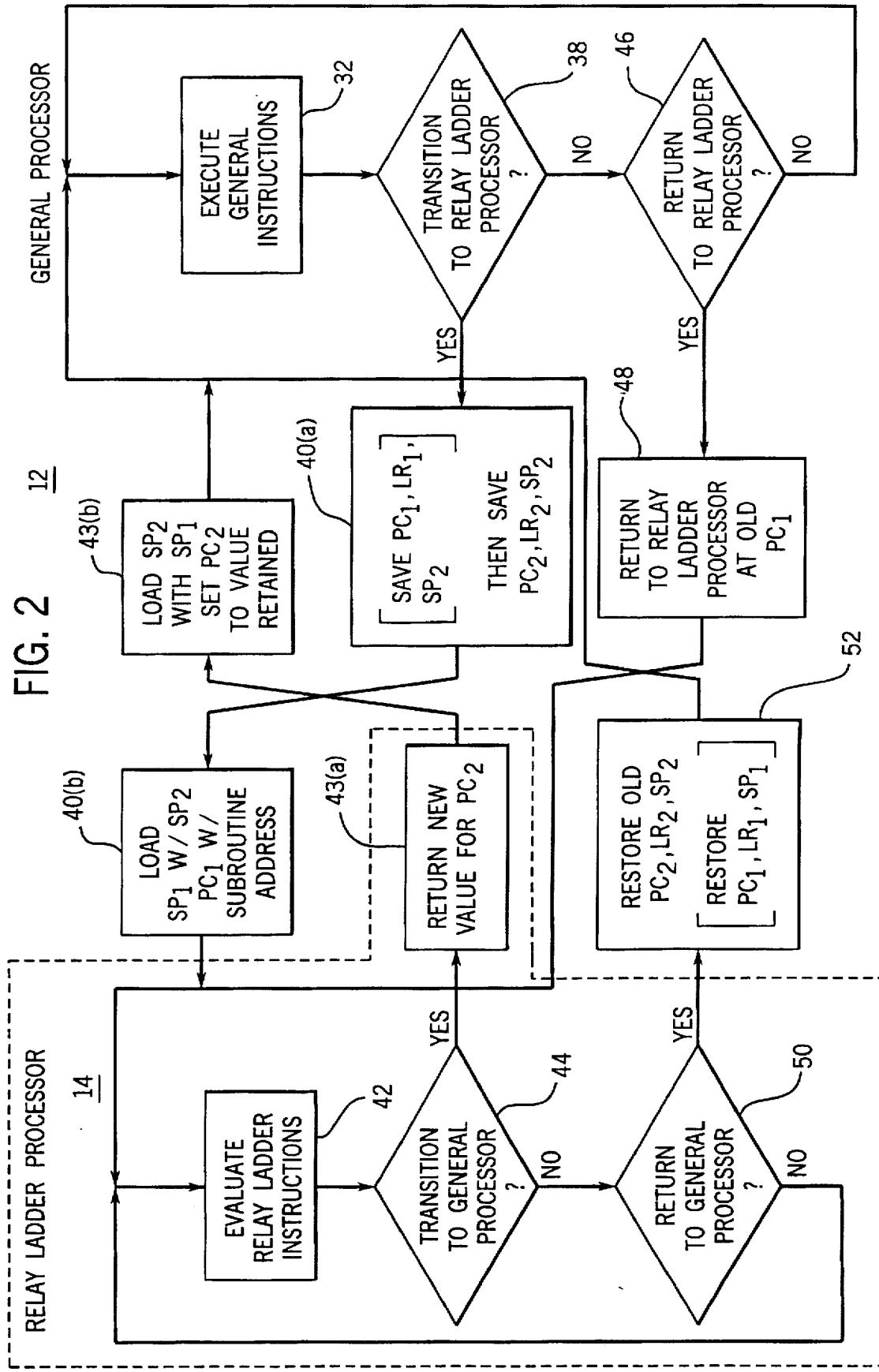
FIG. 2 is a flow chart of the operation of the two processors showing their modification of the other's program counter according to transition and return instructions.

Referring now to FIG. 2, after this first transfer of control to the relay ladder processor 14, the relay ladder processor 14 begins execution of relay ladder instructions per process block 42. This execution continues until the relay ladder processor 14 encounters a "transition instruction" at decision block 44. This transition instruction in the preferred embodiment is a TRP (trap) instruction whose operation will be described in more detail below. Such a transition represents a subroutine call to the general purpose processor 12.

When a transition instruction is encountered at decision block 44, then at process block 43(a), a new value of the program counter $PC_2$ for the general purpose processor 12 is provided to the general purpose processor 12 by operation of the TRP instruction. The relay ladder processor 14 then returns control to the general purpose processor 12 by releasing the WAIT line 36 as indicated at process block 32. There is no need to save the value of the program counter $PC_1$ and link register $LR_1$, for the relay ladder processor 14 at this time because they will be saved prior to any subsequent call of the relay ladder processor 14 as will be seen by the example to be provided below. At this time the relay ladder processor may suspend its operation to conserve power.

The general purpose processor 12 which, prior to the WAIT line 36 being asserted, was awaiting a register transfer, transfers the stack pointer of the relay ladder processor ($SP_1$) to its own stack pointer ($SP_2$) (as indicated by process block 43(b)) and then takes the value provided by the relay ladder processor via the TRP instruction and loads it into program counter $PC_2$ and begins executing general instructions at that address as indicated at process block 32.

The general instructions of the subroutine continue to be executed until, as determined by decision block 38, a new transition instruction is encountered. In the preferred embodiment, the transition instruction will be another MRC RUN. This MRC RUN instruction is preceded by a stack operation that saves the program counter $PC_1$, the link register $LR_1$, and other general purpose registers of the relay ladder processor 14 for subsequent recovery and a new program counter value $PC_1$ is written to the relay ladder processor 14 which will serve to direct processor 14 to the necessary subroutine being called, to be described below. These operations are indicated at process block 40(a) and only occur after the first call to the relay ladder processor 14 as indicated by the brackets around these operations. The values of $PC_2$, $LR_2$ and $SP_1$ are also saved. In addition, at process block 40(b) a new stack pointer $SP_1$ is written with the value of $SP_2$ from the general purpose processor, and the link register $LR_2$ is loaded with the address of an END instruction.

The general purpose processor 12 then transfers control to the relay ladder processor 14. Again at process block 42, additional relay ladder instructions are executed. Assuming that there are no further calls, the next instruction that is not a relay ladder instruction to be encountered will be a RETURN instruction. That will cause the relay ladder processor to return to the address in it's link register $LR_1$, which is the above provided address of the END instruction. Execution of the END instruction by the relay ladder processor will return control to the general purpose processor 12. The relay ladder processor 14 then returns control to the general purpose processor 12 which restores the old value of the program counter $PC_1$, $LR_1$ and other general purpose register as were previously saved by the stack instructions preceding the MRC RUN instruction.

The general purpose processor 12 continues to execute general instructions and, assuming there are no more subroutines to be executed, also ultimately encounters a RETURN instruction at decision block 46. The RETURN instruction transfers control to the relay ladder processor 14 at the value of its program counter $PC_1$, as restored above.

Example Program Execution

Figure 3:
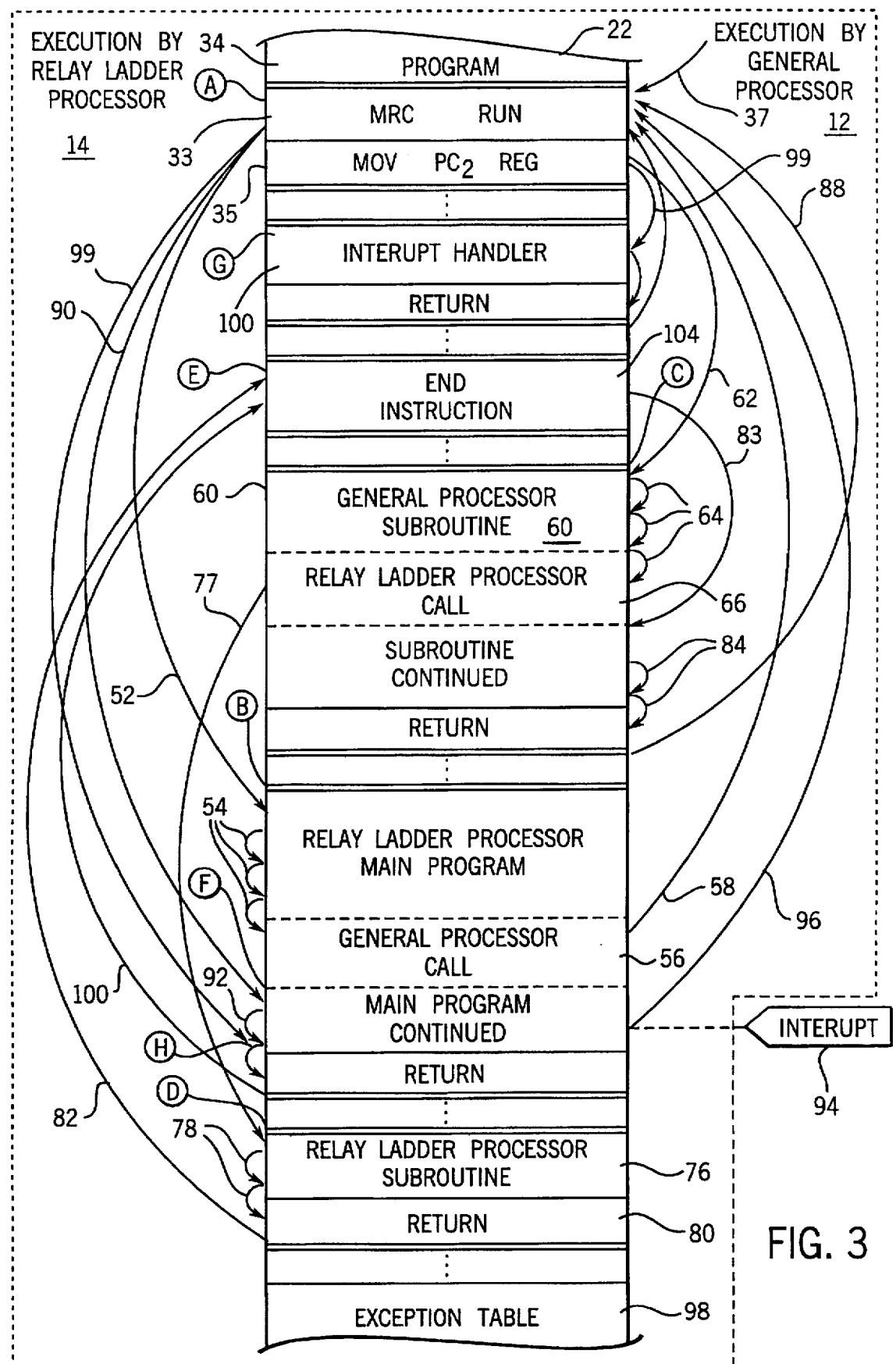
FIG. 3 is a simplified depiction of a program as stored in the memory of FIG. 1 showing the execution thread of an example program as it passes between the two processors.

The operation of these two processors 12 and 14 in calling each other can be illustrated in an example program 22 shown in FIG. 3. As mentioned initially, some preliminary register set-up instructions are executed (not shown). Specifically, the value of $PC_1$ is loaded with address B being the start of the main program to be executed by the relay ladder processor 14. The link register $LR_1$ is loaded with an address E of an END routine. The link register $LR_2$ is loaded with address A of the first transition instruction. This simplifies restarting the relay ladder processor by requiring that the general purpose processor simply return to the address in the link register $LR_2$, the address of the above transition instruction.

Next, the general purpose processor 12 begins execution of a transition instruction MRC RUN indicated by arrow 37 at memory address A.

Upon execution, this transition instruction MRC RUN control is transferred to the relay ladder processor 14 as previously described and through the assertion of a WAIT line, the operation of the general purpose processor 12 is suspended. The relay ladder processor then begins execution of instructions according to the value of its program counter $PC_1$ that has previously been loaded by the general purpose processor 12 through a register transfer instruction of a type that has been described. In this case, the value of $PC_1$ has been loaded with an address B being the start of a relay ladder processor main program. This branching to address B of the relay ladder is indicated by arrow 52. Note that because processors have changed, arrow 52 does not indicate an actual branch but rather shows generally the path of the execution thread through memory.

The relay ladder processor 14 begins execution of the relay ladder instructions in this main program as indicated generally by arrows 54 until it comes to a subroutine call 56. The subroutine call 56 employs a transition instruction which is a TRP instruction having as an operand an address value C to be loaded into the program counter $PC_2$ of the general purpose processor. The TRP instruction is interpreted by the circuitry of the relay ladder processor 14 so that the operand is placed on the data lines 16 to the general purpose processor 12 and so that the operation of the relay ladder processor 14 is suspended and the WAIT line 36 is released.

This release of the WAIT line 36 causes program execution to be transferred as indicated by arrow 58 to the instruction immediately following the MRC RUN instruction at memory address A according to the value in the program counter $PC_2$ of the general purpose processor 12. The stack pointer SP2 is loaded with the value of $SP_1$ from the relay ladder processor, and the link register LR2 is loaded with the address of the MRC RUN sequence at memory address A. Then the address value C returned by the TRP instruction in response to the general processor call 56 is then moved into the program counter $PC_2$ of the general purpose processor 12 by instruction 35 (MOV $PC_2$, REG) overwriting its previous value.

This loading of $PC_2$ causes the general purpose processor to jump to address C, a beginning of a general processor subroutine 60 as indicated by arrow 62. The general processor then continues to execute general instructions of the general processor subroutine 60 as indicated by arrows 64 until a new transition instruction, a relay ladder processor call 66, is encountered requiring execution by the relay ladder processor 14.

This relay ladder processor call 66 includes a transition instruction MRC RUN like the instruction beginning the program 22 but must also include additional stack instructions to allow the proper return from that subroutine.

Figure 4:
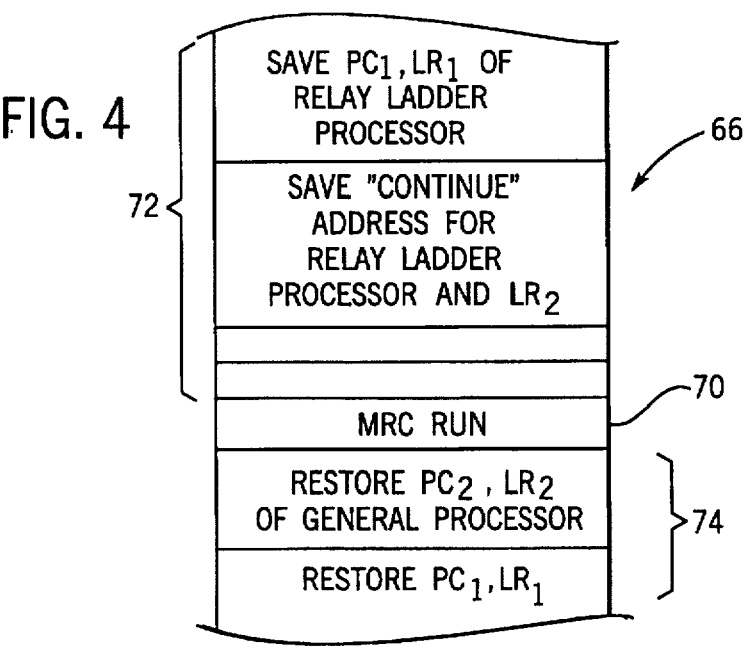
FIG. 4 is a detailed view of the program of FIG. 3 showing additional instructions used for nested subroutine calls.

Accordingly, referring to FIG. 4, the relay ladder processor call 66 includes a transition instruction 70 of MRC RUN preceded by call preparation instructions 72 and succeeded by call return instructions 74. The first of the call preparation instructions 72 saves the program counter $PC_1$, the link register $LR_1$, and various other general purpose registers of the relay ladder processor 14 so that they may be later restored. The second part of the call preparation instruction will save the address of where to continue execution to restore the relay processor register (saved above) and the link register $LR_2$ of the general processor on the stack. This information will be used later to continue general processor execution upon return from the relay ladder processor) part of the processing for the END instruction exception). A new program counter value, in this case address D, indicating the location of the relay ladder processor subroutine 76 shown in FIG. 3 is loaded into the program counter $PC_1$ of the relay ladder processor 14. The stack pointer of the relay ladder processor ($SP_1$) is loaded with the value of the general processor's stack pointer ($SP_2$) and the link register of the relay ladder processor is loaded with the address of an END instruction (in this case the address is E).

Then the transition instruction MRC RUN is executed and control is transferred to the relay ladder processor 14 which begins execution of a relay ladder subroutine at address D as indicated by a branch arrow 77.

The relay ladder processor subroutine is executed as indicated by arrow 78 until a return instruction 80 is encountered. The RETURN instruction instructs the relay ladder processor 14 to jump to the address in its link register, address E, of an END instruction as indicated by arrow 82.

Upon encountering the END instruction 104, the relay processor 14 returns control to the general processor 12 and provides the address of the address of the END instruction exception handler to the general processor 12. The general processor transfers the stack pointer from the relay ladder processor $SP_1$ into its own stack pointer $SP_2$, and loads its link register with the address (A) of the MRC RUN transition instruction. It then loads its program counter PC2 with the value returned from the relay ladder processor. This causes the general processor to execute the END instruction exception handler. The end instruction exception handler with recover a previously saved PC2 and LR2 from the common stack. This causes the general processor to branch back to the general processor subroutine 60 as indicated by arrow 83. There, at call return instructions 74, the value of $PC_1$, $LR_1$ and other general purpose registers of the relay ladder processor 14 are restored to the values that they had prior to the general processor call 56. In particular, $PC_1$ will be restored to the value of address F.

At the conclusion of the general processor subroutine 60, the general processor 12 encounters a RETURN instruction which causes it to jump as indicated by arrow 88 to the address A in its link register (thus loading the value of $PC_2$ with A) which in turn causes the transition instruction MRC RUN to be executed, returning control to the relay ladder processor 14 at address F as indicated by arrow 90. The relay ladder processor 14 continues the execution of the main program as indicated by arrow 92 where an interrupt 94 may occur. The interrupt causes the relay ladder processor 14 to return control to the general processor 12, as indicated by arrow 96, and as with a TRP instruction, with a value for program counter $PC_2$ derived from an exception table 98 having addresses of a particular interrupt handler 100 for the type of interrupt. The address of the interrupt handler, in this case G, is returned to the general processor 12 in apparent response to the MRC RUN instruction, and loaded into $PC_2$ by instruction 35 causing a jump indicated by arrow 99 to an interrupt handler 100 when that value is loaded into the register by instruction 35. If an interrupt 94 occurs at the time the execution is being undertaken by the general processor 12, it is handled as a conventional interrupt operation by the general processor 12.

When the interrupt handler 100 is completed, a RETURN instruction at its end causes the general processor 12 to jump back to address A transition instruction 33 which returns control to the relay ladder processor 14 at address H in its main program where it last executed.

Finally, the relay processor 14 will encounter a RETURN instruction which causes it to branch to address E (still in the link register) as indicated by arrow 102. As before, the END instruction 104 in turn causes the relay ladder processor 14 to return control to the general processor 12 also providing to the general purpose processor 12 the address of the END instruction exception handler for loading into $PC_1$ per instruction 35. The general purpose processor 12 may then begin execution of the end instruction exception handler ending the program 22.

Thus the general processor may direct control to the relay ladder processor as required through the register transfer instruction MRC RUN and the relay ladder processor 14 may invoke the operation of the general processor 12 through a TRP instruction which simply returns data to a pending MRC instruction held in suspension by the activation of the WAIT line by the relay ladder processor.

In particular, this co-processor interface which allows both the processor and co-processor to make calls on the other device makes use of standard communication protocols for the general purpose processor and requires no particular modifications to the general purpose processor. The calls made by the relay ladder processor 14 are in the form of returns from suspended register transfer instructions and thus do not require special circuitry in the general processor.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made:

We claim:

1. An industrial controller for executing a user program having relay ladder control instructions and general computer instructions, the controller comprising:
   a relay ladder processor having a first program counter identifying instructions of the user program for the relay ladder processor to execute;
   a general processor having a second program counter identifying instructions of the user program for the general processor to execute;
   wherein the relay ladder processor operates to:
   (i) execute the relay ladder control instructions identified by the first program counter;
   (ii) respond to at least one first transition instruction by transferring a new value to the second program counter of a general processor and transferring control to the general processor; and
   (iii) respond to at least one first return instruction by returning control to the general processor at an old value of the second program counter;
   and wherein the general processor operates to:
   (i) execute the general computer instructions identified by the second program counter;
   (ii) respond to at least one second transition instruction by transferring a new value to the first program counter of the relay ladder processor and transferring control to the relay ladder processor; and
   (iii) respond to at least one second return instruction by returning control to the relay ladder processor at an old value of the first program counter.

2. The industrial controller as recited in claim one wherein the general processor responds to the second transition instruction also by saving a value of the first program counter prior to transferring a new value to the first program counter.

3. The industrial controller of claim 1 wherein the second transition instruction is an instruction requesting a value of a register from the relay ladder processor.

4. The industrial controller of claim 3 wherein the instruction requesting a value of a register from the relay ladder processor is followed by an instruction transferring the requested value to the second program counter.

5. The industrial controller of claim 4 wherein the general processor includes a wait input suspending operation of the general processor when the wait input is asserted and wherein the instruction requesting a value of a register causes the relay ladder processor to assert the wait line.

6. The industrial controller of claim 4 wherein the first transition instruction is an instruction returning to the general processor a value in response to the request for a value of a register.

7. The industrial controller of claim 4 wherein the relay ladder processor also
   (iv) responds to at least one first transition instruction by transferring a new value to a stack pointer of the general processor; and
   and wherein the general processor also:
   (iv) responds to at least one second transition instruction by transferring a new value to the stack pointer of the relay ladder processor.

8. An industrial controller for executing a user program having relay ladder control instructions and general computer instructions, the controller comprising:
   a relay ladder processor having a first program counter identifying instructions of the user program for the relay ladder processor to execute;
   a general processor having a second program counter identifying instructions of the user program for the general processor to execute;
   wherein the relay ladder processor operates to:
   (i) execute the relay ladder control instructions identified by the first program counter;
   (ii) respond to at least one first transition instruction by transferring a new value to a stack pointer of the general processor and transferring control to the general processor;
   and wherein the general processor operates to:
   (i) execute the general computer instructions identified by the second program counter;
   (ii) respond to at least one second transition instruction by transferring a new value to the stack pointer of the relay ladder processor and transferring control to the relay ladder processor; p3 whereby the relay ladder processor and general processor may share the same stack and pass parameters via the shared stack.

9. The industrial controller of claim 1 wherein the relay ladder processor:
   responds to an interrupt signal by transferring a new value to the first program counter of the second processor and returning control to the second processor.

10. The industrial controller of claim 1 wherein the relay ladder processor:
    responds to an interrupt signal by transferring a new value to the first program counter of the second processor and returning control to the second processor.

11. The industrial controller of claim 10 wherein the new value is determined by the type of interrupt.

12. The industrial controller of claim 1 wherein the relay ladder and general processor include a first and second link register respectively indicating an instruction to execute and wherein the relay ladder and general processor respond to the first and second return instructions by executing an instruction at an address identified by the first and second link registers respectively and wherein the instructions identified by the first and second link registers cause transfer of control between processors.

13. The industrial controller of claim 2 wherein the general processor saves the value of the first program counter in a stack.

14. The industrial controller of claim 1 wherein the relay ladder processor after transferring control to the general processor suspends operation to preserve power until control is returned by the general processor to the relay ladder processor.

* * * * *